(No Model.) 2 Sheets—Sheet 1.

W. McDONALD.
EDGER.

No. 243,717. Patented July 5, 1881.

Witnesses
S. N. Piper

Inventor.
Wm. McDonald.
by R. H. Eddy atty.

(No Model.) 2 Sheets—Sheet 2.

W. McDONALD.
EDGER.

No. 243,717. Patented July 5, 1881.

Witnesses
J. N. Piper

Inventor
William McDonald
by R. H. Eddy atty.

UNITED STATES PATENT OFFICE.

WILLIAM McDONALD, OF CALAIS, MAINE.

EDGER.

SPECIFICATION forming part of Letters Patent No. 243,717, dated July 5, 1881.

Application filed March 7, 1881. (No model.) Patented in Canada March 11, 1879.

*To all whom it may concern:*

Be it known that I, WILLIAM MCDONALD, of Calais, of the county of Washington and State of Maine, have invented a new and useful Improvement in Edgers or Machines for Sawing Lumber; and I do hereby declare the same to be described in the following specification, and represented in the accompanying drawings, of which—

Figure 1:
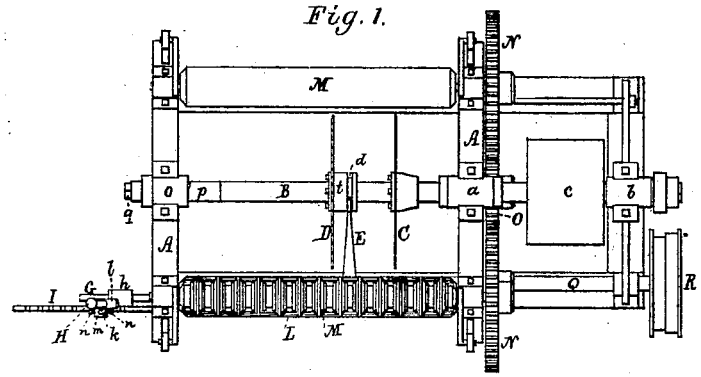
Figure 2:
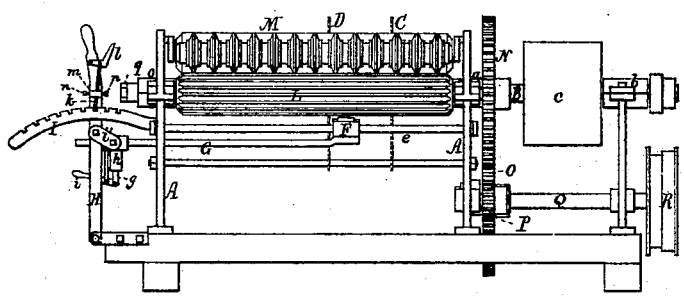
Figure 3:
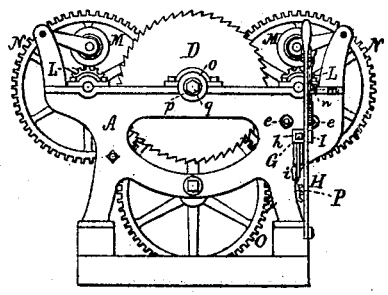
Figure 5:
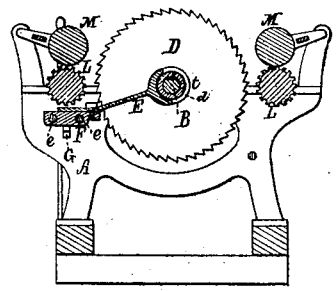
Figure 4:
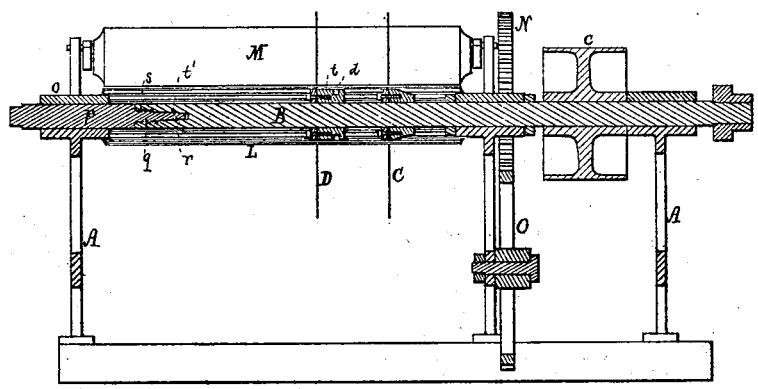

Figure 1 is a top view, Fig. 2, a front elevation, Fig. 3 an end view, Fig. 4 a longitudinal section, and Fig. 5 a transverse section, of a machine containing my invention, the nature of which is defined in the claim or claims hereinafter set forth.

The machine contains a gang of two or more circular saws, one of which is fixed to their common arbor, and each of the others is adapted to such arbor, so as to be adjustable thereon relatively to the fixed one and lengthwise of the arbor, and is provided with mechanism, as hereinafter explained, for supporting such saw and adjusting it relatively to each of the others, as occasion may require, for a piece of timber, board, or plank to be reduced to sections of like or different thicknesses.

Figure 6:
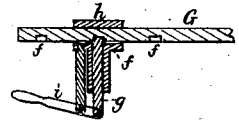

In the said drawings, A denotes the frame of the machine, having within it medially a long shaft or arbor, B, supported near one end in two stationary boxes, $a$ $b$, between which and fixed to the shaft is its driving wheel or pulley $c$. There is fastened upon the arbor concentrically a circular saw, C, and one or more auxiliary adjustable like circular saws, D, each of which latter is adapted to the arbor, so as to be capable of being slid lengthwise thereon either away from or toward the fixed saw. Each saw so movable is further applied to the arbor so as to be revolved with or by it, the connection being by a long groove in the arbor, and a projection from the saw-hub to enter such groove. Furthermore, the hub $t$ of each movable saw has in and around it a groove, $d$, to receive a furcated arm, E, extending from a carrier, F, adapted to and to slide upon two stationary and parallel rods, $e$ $e$, extending across the frame of the machine. From this carrier a bar, G, is projected, and is notched, (see Fig. 6, which is a section of such bar and its slide and catch-bolt,) as shown at $f$ $f$, to receive the end of a catch-bolt, $g$, such bolt being adapted to a slide, $h$, and provided with a hand-lever, $i$, for moving it (the said bolt) into or out of either of the notches $f$. The slide $h$ encompasses and slides upon the notched bar G, and is connected with a set-lever, H, by means of a link, $i'$, arranged as shown. The lever fulcrumed at its foot to the frame A operates in connection with a curved notched arm or rack, I, projecting from the said frame. A bolt, $k$, jointed at top to a knee-lever, $l$, fulcrumed to the lever H, extends down through a projection, $m$, from the said lever H, such projection being provided with screws $n$ $n$, which screw into it and against opposite sides of the bolt. These screws are to adjust the bolt properly to the rack, in order to bring the movable saw to the desired distance from the stationary or fixed saw when the other bolt is in either notch of the bar G. The curved rack has a series of notches or teeth to its upper edge, which may be one inch or other proper distance apart, and may be numbered on the side of the rack.

The arbor B terminates at a distance from a third box, $o$, somewhat greater than the width of one of the movable saw-arbors, and abuts against a short cylinder or removable journal, $p$, of like diameter with the said arbor B, and arranged to revolve in the said third box and to be capable of being moved or slid endwise thereon. A male screw, $q$, projects from the inner end of the piece $p$, and there also extends from the screw a tapering projection, $r$, all being in one piece with the journal. Furthermore, the arbor B, at its end next the journal $p$, is provided with a female screw, $s$, and with a tapering socket, $t'$, to receive the screw $q$ and the projection $r$, the latter, with its socket $t'$, serving to guide the screw $q$ properly to the female screw $s$, in order for the two to properly couple and screw together on the journal being forced toward the arbor. The projection and socket insure the engagement of the screws in case of slight settling of the arbor, and prevent accidental overriding and injury to the screw-threads.

On separating the movable journal $p$ from the arbor and sliding the movable journal $p$ back a saw may be readily removed from the arbor or applied thereto, as occasion may require, the movable journal $p$ and its connection with the arbor and the sustaining-box of the movable journal $p$ being necessary to support the arbor at its end next the movable journal $p$.

Feed-rollers L L are arranged on opposite sides of the arbor B, and have over them pressure-rollers M M, suitably adapted to operate with them in propelling the stuff to be sawed against and from the saws. Gears N N on the shafts of the feed-rollers engage with an intermediate gear, O, which in turn engages with a pinion, P, fixed on a shaft, Q, provided with a driving-wheel, R, all being arranged substantially as represented.

Each adjustable saw is to have mechanism, substantially as described, for adjusting and supporting it in position, the drawings representing such mechanism and only one adjustable saw; but it is to be understood that more than one may be adapted to the arbor, as occasion may require.

In operating with the machine the material to be sawed is to be introduced between one of the feed-rollers and its pressure-roller while they may be in operation. The material will, by the feed-roller, be driven forward against the saws, and will be slit by them and pass from them to and between the other feed-roller and its pressure-roller, by which it will not only be drawn forward after having departed from the first feed-roller, but discharged from the machine.

What I claim as my invention is as follows:

1. The sliding journal $p$, arranged in the box $o$, and provided with the connecting-screw $q$ and the tapering projection $r$, as set forth, in combination with the saw-arbor B, having the female screw $s$, and the tapering socket $t'$, arranged in it, as shown, and to operate with the said screw $q$ and projection $r$, substantially as explained.

2. The combination, substantially as described, for adjusting each auxiliary or adjustable saw relatively to the fixed saw, and supporting such auxiliary saw in position on the arbor, such combination consisting of the grooved hub $t$, the furcated arm E, its supports F $e$ $e$, the notched bar G, the bolt $g$, and slide $h$ of the latter, the link $i'$, the set-lever H, the rack I, and the adjustable bolt $k$ and its adjusting-screws $n$ $n$, applied to said lever H, all being adapted and to operate essentially as set forth.

WM. McDONALD.

Witnesses:
JOHN BARKER,
A. C. HARVEY.